(12) United States Patent
Sharma et al.

(10) Patent No.: US 12,340,104 B1
(45) Date of Patent: Jun. 24, 2025

(54) UNIVERSAL STORAGE HANDLER

(71) Applicant: Expedia, Inc., Seattle, WA (US)

(72) Inventors: Sumit Sharma, Delhi (IN); Ankur Kumar Singh, Gurgaon (IN)

(73) Assignee: Expedia, Inc., Seattle, WA (US)

( * ) Notice: Subject to any disclaimer, the term of this patent is extended or adjusted under 35 U.S.C. 154(b) by 0 days.

(21) Appl. No.: 18/410,476

(22) Filed: Jan. 11, 2024

(30) Foreign Application Priority Data

Dec. 21, 2023 (IN) .............................. 202341087583

(51) Int. Cl.
*G06F 3/00* (2006.01)
*G06F 3/06* (2006.01)

(52) U.S. Cl.
CPC .......... *G06F 3/0635* (2013.01); *G06F 3/0604* (2013.01); *G06F 3/0617* (2013.01); *G06F 3/067* (2013.01)

(58) Field of Classification Search
CPC .... G06F 3/0635; G06F 3/0604; G06F 3/0617; G06F 3/067
See application file for complete search history.

(56) References Cited

U.S. PATENT DOCUMENTS

| | | | |
|---|---|---|---|
| 5,809,078 A * | 9/1998 | Tani | H04L 49/9073 370/413 |
| 6,549,992 B1 * | 4/2003 | Armangau | G06F 11/1456 714/E11.12 |
| 9,547,654 B2 | 1/2017 | Bhardwaj et al. | |

\* cited by examiner

*Primary Examiner* — Craig S Goldschmidt
(74) *Attorney, Agent, or Firm* — Knobbe Martens Olson & Bear LLP

(57) ABSTRACT

Aspects of the present disclosure enable a storage manager to provide access to storage systems of varying types, such as database storage systems or indexed data storage systems, to a data source and allow for use of reserved storage capacity of the storage systems. The storage manager may provide access to storage systems under the control of different cloud storage providers. The storage manager may provide for temporary data storage in a reserved portion of a storage system when processing capacity of a data processing system is exceeded. The storage manager may provide for temporary storage of query results retrieved from a database system in a reserved portion of a data store. The storage manager may provide for temporary storage of data used for data enrichment in a reserved portion of a data store.

19 Claims, 5 Drawing Sheets

UNIVERSAL STORAGE HANDLER

BACKGROUND

Computing systems can connect to storage systems (e.g., local, or remote) to store data. Data storage demands can vary based on a variety of factors. For example, some data requires permanent or semi-permanent storage, and other data may only need to be stored for a limited amount of time. Computing systems can connect to data processing elements used to process streaming data. Data processing elements may have a processing limit (e.g., a maximum data processing bandwidth), which when exceeded may lead to the loss of data.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate example embodiments described herein and are not intended to limit the scope of the disclosure. To easily identify the discussion of any particular element or act, the most significant digit(s) in a reference number typically refers to the figure number in which that element is first introduced.

DETAILED DESCRIPTION

Figure 1:
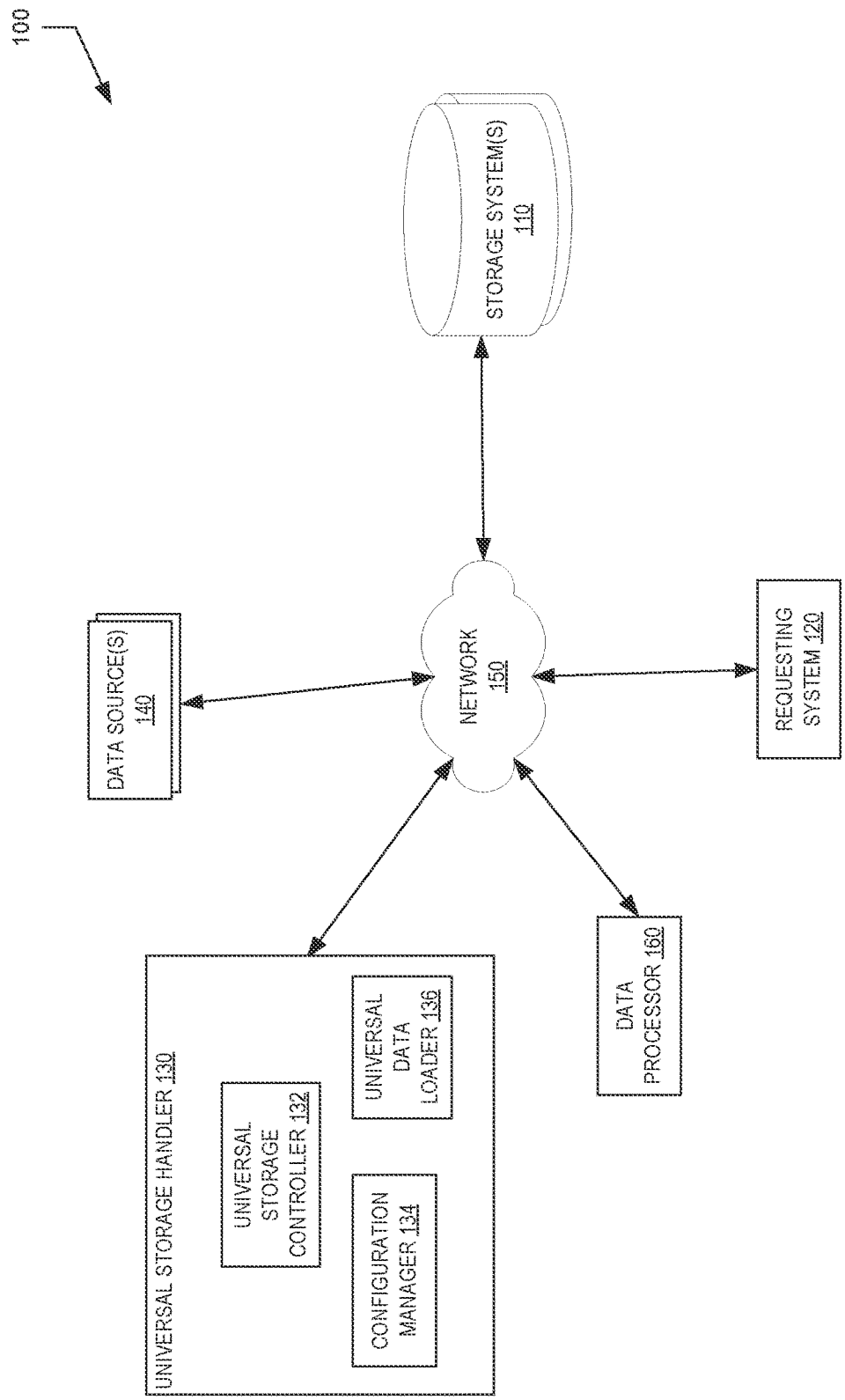
FIG. 1 is a block diagram of illustrative data flows in a system implementing a universal storage handler according to some embodiments.

The present disclosure relates to managing unused storage capacity in a storage system as temporary storage to minimize the need to requisition additional storage capacity. The disclosure aims to optimize unused but accessible data storage capacity in several unique applications and use cases described further herein.

Some conventional data storage systems (e.g., networked data storage systems, cloud data storage systems, etc.) allow for automated distribution of data (e.g., structured data, unstructured data, and the like) to one or more storage environments. The data storage environments may be under the control of the data storage system. The data may comprise or be formatted differently into one or more format types, and information can be stored across different types of storage environments which can each be configured or optimized for storing one or more storage formats. For example, some data can be formatted as a database object. The storage environments can include cloud storage services (e.g., KAFKA®, REDIS®, AMAZON S3®, or the like) configured to allow a data storage system to remotely store and retrieve data from the provided storage environments. The cloud storage services may be offered and/or managed by different cloud storage providers, where a first cloud storage provider does not provide functionality for interacting with and/or managing storage environments of a second cloud storage provider. Additionally, such conventional systems may have a fallback storage system used to store information temporarily when an intended or primary storage system is unavailable. An intended storage system may be unavailable for various reasons. For example, the intended storage system may have a maximum input bandwidth and an input information volume may exceed the maximum input bandwidth, such as during a spike in interaction with a website, database, or other information system. The intended storage system may be unavailable because the amount of storage reserved or otherwise available for storing new information may be full. An intended storage system may be unavailable for various additional reasons, for example because of a disruption in a connection to the storage system, a change to an application programming interface ("API") used to access the storage system, and the like.

Additionally, some data storage systems will be configured to use less than all of the storage provisioned in a data store. A system can be configured to reserve a percentage of total storage available so that the reserved portion of the total storage can be used to store additional data during high traffic periods. Such a reserved portion of storage may be referred to as excess storage. For example, a storage system configured to store a database object may generally store an average of 200 GB of data, but in order to prepare for occasional periods of high traffic where additional data must be stored in the database, the storage system may be configured with 300 GB of total available storage. The additional 100 GB would then be an excess storage portion of the total storage. Maintaining excess storage to allow for high traffic periods can lead to such storage being unused for significant periods of time, wasting costly storage resources which could otherwise be used.

In many cases, high traffic periods will be unpredictable, and thus, excess storage may be maintained indefinitely with the expectation that a high traffic period will occur at some future time and the excess storage will be useful at that point. However, such high traffic periods may be temporary, and may occur rarely (e.g., once an hour, once a week, twice a year, etc.). For example, a travel reservation management system may allow queries for flights offered by various flight providers. Without informing the travel reservation system, a flight provider may have a sale on ticket prices, leading to an unexpected and sudden increase in queries for flights. The increase in queries may then exceed the storage capacity of a search system of the travel reservation management system. Conventional data storage systems may then fail to respond to queries exceeding the storage capacity of the search system due to not having a storage system available for temporary storage of the excess queries. Alternatively, an additional storage system may need to be provisioned by the data storage system even though other storage systems of the data storage system may have available storage space, leading to wasted data storage capacity.

Further, some data storage systems will have at least one storage system configured as a database storage environment to store a database. The database storage environment can store a database, and the database can be queried to output results to a system or user with access to the storage system. Querying a database can require significant processing and storage resources (e.g., memory, communications bandwidth between a processor and memory, etc.), as human and machine generated queries are typically written inefficiently taking up unnecessary storage space. Even where a query is written to be efficient, due to the size of many databases, the processing and temporary storage required to provide a response to the query may still require significant computing resources. Additionally, when a response to a query has been generated, such systems can transmit the result and then, due to limited storage capacity, delete the result of the query from the memory of the storage system to limit or minimize overutilization of available storage capacity, and to further avoid the need to use the excess storage since the excess storage should remain available for high traffic periods.

Some aspects of the present disclosure address some or all of the issues noted above, among others, by implementing a universal storage handler to manage a distributed storage system, where the distributed storage system includes various different storage systems (e.g., storage provided by different cloud storage providers, storage configured to store different data types, storage configured to store different data formats, and the like). The universal storage handler may be configured to utilize excess storage of the distributed storage system for the temporary storage of data in a storage system of the distributed storage system different from an intended storage system. Storing data temporarily in excess storage may avoid the need to provision additional storage capacity, while maintaining the availability of excess storage in case of a high traffic period. For example, a first storage format can be configured to store information in the form of a database, a second storage format can be configured to store indexed searchable data, and a third storage format can be configured to store data in the form of a message queue (e.g., a publisher-subscriber ("pub-sub") message queue). One or more of the storage systems connected to the distributed storage system may have a portion of its available storage reserved to store unusually high volumes of data during high-traffic periods in order to ensure storage is available when needed.

The distributed storage system (or simply "system") may also be connected to a data source, which provides information to be stored in a storage system connected to the system. A data source can transmit data to the system, and the universal storage handler may intercept the data before it reaches the system. The data source can provide additional information with the data indicating a data type (e.g., query response data, a database object, enrichment data, etc.), an intended storage system for the data (e.g., a storage system configured for database storage, a storage system configured for rapid retrieval of data, etc.), a use case of the data (e.g., data enrichment, database queries, etc.), and the like.

Alternatively, the universal storage handler can be configured to identify a type of the information and determine an appropriate storage system for the data automatically. Determining a data type or appropriate storage system may increase the efficiency of data storage and data retrieval. When the universal storage handler receives data from the data provider, the universal storage handler can determine the intended (e.g., preferred) or appropriate storage system of the system is currently unavailable to store the data. The universal storage handler can then identify an alternative storage system for the data based on evaluating available excess storage in a storage system of the system and determining the excess storage is of a correct storage format for the data. The universal storage handler can then transmit the data to the storage system having available excess storage, and monitor the intended storage system until storage becomes available for the information. The data can then be transferred from the excess storage of the storage system to the intended storage system of the distributed storage system.

Additionally, the universal storage handler may determine to move data from excess storage of a first storage system to excess storage of a second storage system, for example, when the excess storage of the first storage system may be needed to store data associated with the intended use of the first storage system. The universal storage handler may then transfer the data temporarily stored in the excess storage of the first storage system to excess storage of a second storage system, which has available excess storage capacity for the data. In another example, the universal storage handler may have stored data in excess storage of a first storage system having a first storage characteristic (e.g., storage medium type, a data throughput, or other characteristic which may affect the performance of the storage system). The universal storage handler may then determine a second storage system has a second storage characteristic which is advantageous compared to the first storage characteristic for storing the data (e.g., the second storage system may have a higher input/output speed for data storage and retrieval, allowing faster transfer of the data to the intended storage system). When the second storage system has been determined to have a preferable storage characteristic relative to the first storage system, the universal storage handler may then transfer the data to the excess storage of the second storage system from the In some implementations, the universal storage handler can identify two or more storage systems of the system having available excess storage of the intended storage format for a first set of data. The universal storage handler can then determine that no storage system has enough excess storage to temporarily store the first set of data. The universal storage handler can then divide the first set of data into subunits. For example, the size of each subunit can be based on the size of the excess storage available to temporarily store the first set of data. The subunits can then be stored in each excess storage location of the storage systems. When a determination is made that the intended storage system is available to store the first set of data, the universal storage handler can transfer the subunits to the intended storage system.

Advantageously, throughout the temporary storage and transfer processes described above, input or guidance from the data provider is not necessary and the data provider, in some implementations, may not be made aware of the storage configuration used to store the data. This may lower the need for additional communication between the data storage system and the data provider, preserving available communication bandwidth for data transfer. Additionally, this may enable integration with existing storage solutions without the need for reconfiguration of the data provider, storage system, or data requester. When a data requester provides a request for the first set of data, the system identifies the current location of the requested data, and retrieves it to be provided to the data requester in response to the request. When the data is stored across multiple storage systems in multiple data portions, the system may additionally reconstruct the original data from the data portions.

Additional aspects of the present disclosure relate to managing a spike (e.g., a higher than usual volume) in incoming data to a data processing element. A data processing element is a component of a computing system configured to accept data as input and perform a defined processing function on the data to generate additional information. Data processing elements may have an input data limit defining a maximum volume of input data which the data processing element is able to process at a time (e.g., 35 Gb/s, 1.3 Tb/s, 200 MB/ms, etc.), and incoming data may exceed the input data limit resulting in excess data which the data processing element is unable to process. Conventional systems may react to such a spike by either requesting additional storage resources (even though reserved storage resources are available) or may lose all data beyond the input limit of the data processing element. The universal data handler, however, allows for the temporary storage of data exceeding the input data limit of the data processing element in the excess storage space of a storage system of the distributed storage system. Advantageously, this may allow the universal storage handler to avoid requesting additional storage capacity, or otherwise minimize the amount of additional storage capacity required. To achieve such temporary storage, the universal storage handler allows for the identification of excess storage capacity configured to store a data type associated with the input data provided to the processing element. The universal storage handler may then store at least a portion of the excess data in a reserved storage system associated with the distributed storage system.

As the reserved storage is needed, the universal storage handler may move the excess data between excess storage of the storage systems. When the input data volume has returned to a level below the input data limit of the processing element, the universal storage handler can then retrieve the stored excess data and provide the excess data as input to the data processing element. In some implementations, the excess data can be associated with an expiration time, for example, where processing the excess data no longer results in useful output after the expiration time has passed. In such implementations, the universal storage handler can instruct a storage system to delete excess data which has been stored in excess storage of a storage system beyond the expiration time. Advantageously, such a configuration allows for processing of as much of the input data as possible by allowing for the entire data input limit of the processing element to be used as long as there is additional data to be processed.

Further embodiments of the present disclosure relate to the temporary storage of query results received in response to querying a database. A requestor can provide a request, which includes a query (e.g., a SQL query), to a database storage system of the distributed storage system. The query is intercepted by the universal storage handler. The universal storage handler can then provide the request to the database storage system to run the query on a database stored by the database storage system. Running the query generates a result, including information responsive to the query. For example, a query can include the SQL command "SELECT * from Properties;" and in response, the database storage system will return all records in a Properties table. Generating the response may require significant computing resources of the database storage system, and may consequently reduce the ability of the database storage system to provide other database functionality to additional requesting systems (e.g., adding records, deleting records, joining tables, responding to additional queries, etc.). Therefore, it may be desirable to store responses to queries, such as queries which have been requested more than once, for a period of time so that the response can be provided to a requesting system without the need to repeatedly run the same computationally intensive queries on the database storage system.

The universal storage handler allows for the storage of such results in the excess storage capacity of storage systems associated with the distributed storage system (e.g., reserved storage of a storage system in communication with the universal storage handler), reducing or eliminating the need to provision additional storage for the purpose of storing query results. In some implementations, the query result can be associated with an expiry time (e.g., a time after which the query result may no longer reflect the current state of the database), indicating a time at which the query should be deleted so that the query associated with the result must be run on the database storage system again. Alternatively, a query result storage condition can be associated with the query result indicating a condition under which the query result should be deleted by the storage system. For example, the condition may indicate the query result is to be deleted when a table associated with the query result is updated in the database storage system.

Various aspects of the disclosure will be described with regard to certain examples and embodiments, which are intended to illustrate but not limit the disclosure. Although aspects of some embodiments described in the disclosure will focus, for the purpose of illustration, on particular examples of storage locations, storage formats, processing elements, and the like, the examples are illustrative only and are not intended to be limiting. In some embodiments, the techniques described herein may be applied to additional or alternative types of storage locations, storage formats, processing elements, and the like. Additionally, any feature used in any embodiment described herein may be used in any combination with any other feature or in any other embodiment, without limitation.

Example Universal Storage Handler Environments

With reference to an illustrative example, FIG. 1 shows data flows for implementing storage and retrieval of information by a universal storage handler 130 within a data processing environment 100. The data processing environment 100 includes a universal storage handler 130, a requesting system 120, a data processor 160, a data provider 140, a network 150, and a storage system 110.

The universal storage handler 130 is configured to provide seamless storage and retrieval of data using excess storage space of a storage system 110. Data may be received from the data provider 140. In some embodiments, the data provider 140 may be a computing system generating data, or receiving new data (e.g., data input by a user associated with the data provider 140). In additional embodiments, the data provider 140 may be a storage system 110, which a requesting system 120 is requesting data from and which data is to be stored by the universal storage handler 130 in a different storage system 110 from the data provider 140. Excess storage space may include, but is not limited to, storage space provisioned for use (e.g., by a user associated with the requesting system 120) but not currently in use. For example, reserved storage space may be provisioned in excess of current storage needs of a system in order to handle a potential future spike in information received, to handle predicted incoming information, or because past storage needs exceed current storage needs and the excess storage capacity has not been released (e.g., because releasing excess storage capacity requires migrating information from the storage system to a smaller storage system).

In some embodiments, the universal storage handler 130 may be implemented as a service operating in a cloud computing environment. The cloud computing environment may be associated with a cloud storage provider providing a storage system 110 for the universal storage handler 130. Alternatively, the cloud computing environment may be separate from all storage systems 110 managed by the universal storage handler 130. The universal storage handler 130 communicates with each storage system, for example, via the network 150, to control where data received from a data provider 140 is stored. When an intended storage system 110 is unavailable to store data received from the data provider 140, the universal storage handler 130 identifies a second storage system 110 which is available to store the data temporarily until the intended storage system 110 becomes available, as described in further detail below herein.

The universal storage handler 130 comprises a universal storage controller 132, a configuration manager 134, and a universal data loader 136. It should be understood that each of the universal storage controller 132, configuration manager 134, and universal data loader 136 are described individually for the purpose of clarity, but each may perform any action described as associated with the universal storage handler 130, and in some embodiments the universal storage controller 132, configuration manager 134, and/or universal data loader 136 may be combined.

The universal storage controller 132 is configured to manage the operations performed by the universal storage handler 130, including managing the storage and retrieval of data items. For example, the universal storage controller 132 may determine that an intended storage system 110 of the data processing environment 100 temporarily does not currently have storage capacity for at least a portion of data received from a data provider 140, but that the intended storage system 110 is likely to have storage capacity in the future (e.g., as data received by the intended storage system 110 is compressed for long-term storage). The universal storage controller 132 may then identify a second storage system 110 with available excess storage capacity, where the second storage system 110 would not normally be used to store data received from the data provider 140. The second storage system 110 may be of a different storage type from the intended storage system 110 (e.g., the intended storage system may be a database storage system and the second storage system may be a data lake storage system, or the intended storage system may be offered by a first cloud provider and the second storage system may be offered by a second cloud storage provider). Additionally, the intended storage system 110 may be under control of a first cloud storage provider, and the second storage system 110 may be under control of a second cloud storage provider. The first cloud storage provider and the second cloud storage provider may not offer an ability to transfer data automatically between the intended storage system 110 and the second storage system 110. Further, the first cloud storage provider and the second cloud storage provider may not provide unified storage management between the two different cloud storage providers. The universal storage handler 130 then provides unified storage management for each storage system 110 in communication with the universal storage handler 130.

When the universal storage controller 132 has identified the second storage system 110 as having available excess capacity, the universal storage controller 132 temporarily stores the portion of data in the available excess capacity. The universal storage controller 132 then monitors the intended storage system 110 until the intended storage system 110 has available storage capacity for the portion of data. When the storage system 110 has available storage capacity for the portion of data, the universal storage controller 132 retrieves the portion of data from the second storage system 110 and transfers it to the intended storage system 110 for storage. Alternatively, an application and/or user of the requesting system 120, may monitor the storage system 110 to determine that there is available storage capacity for the portion of data. In such embodiments, when the storage system 110 has available storage capacity, the requesting system 120 may instruct the universal storage controller 132 to retrieve the portion of the data from the second storage system and store the portion of the data in the storage system 110.

Additionally, the universal storage controller 132 may be configured to manage the addition and removal of storage systems, which may be referred to as connectors, for use by the universal storage handler 130. For example, when a new storage system is provided for use by the universal storage handler 130, the universal storage controller 132 may request any of the storage format, storage capacity, excess storage capacity, excess storage throughput or any other information useful for identifying the type and amount of data which may be stored at the new storage system by the universal storage handler 130. The universal storage controller 132 may then store such information for use in determining a suitable storage system for received data.

The configuration manager 134 is configured to manage configuration information for the storage system 110 in communication with the universal storage handler 130. Managing configuration information may include at least storing configuration information (e.g., total available capacity, API information, etc.) for the storage system 110, updating configuration information for the storage system 110, or requesting unknown configuration information for the storage system 110 from the storage system 110 or a storage system having configuration information for the storage system 110.

The universal data loader 136 is configured to read information from and write information to a storage system 110. When storing information in a storage system 110, the universal data loader 136 may generate API calls to the storage system 110 used to store data and/or retrieve stored data. Further, the universal data loader 136 may manage the transmission of data to the storage system 110 at a rate acceptable to the storage system 110, such that data is not lost due to overloading of an input of the storage system 110. Additionally, the universal data loader 136 may manage the division of data into data portions to be stored at two or more storage systems 110. For example, the configuration manager 134 may provide information to the universal data loader 136 indicating an available excess storage of a first storage system 110 and a second storage system 110, and the configuration manager 134 may then divide data to be stored into a first portion of a size less than the available reserve storage of the first storage system 110 and a second portion of a size less than the available excess storage of the second storage system 110. The universal data loader 136 may then transmit the first portion to the first storage system 110 and the second portion to the second storage system 110. Additionally, when retrieving information, the universal data loader 136 may determine the location of the data to be retrieved. When the data to be retrieved is stored in two or more storage systems 110, the universal data loader 136 may retrieve each portion of the stored data, and recombine the portions of the stored data.

The requesting system 120 is a computing device configured to transmit a request to store information. A request, as used herein, may include a variety of operations. For example, a request may be a request sent to the universal storage handler 130 to store data. The request of this example may include information to be stored, or a pointer to information to be stored from a data provider 140. The request may further include a type of the information to be stored, an intended storage system, an intended storage format, a length of time for which the information is to be stored (e.g., a retention policy associated with the information), or an indication of a data processor 160 to process the information. In some embodiments, the request may comprise a query to a database stored in a storage system 110 or a data provider 140. Where the request comprises a query, at least a portion of the request may be received by the universal storage handler 130 as a SQL query, or a query written in another query language. Alternatively, the request may be in a natural language form, or other form not structured as a query, and the universal storage controller 132 may parse the request to determine a query.

The data provider 140 is at least one computing system configured to provide data to the universal storage handler 130 for storage and/or use by another system of the data processing environment 100. For example, the data provider 140 may be a streaming data source configured to continuously provide information for processing by the data processor 160. Alternatively, the data provider 140 may be a computing system configured to store and provide access to a database. In another example, the data provider 140 may be a storage system 110 storing data which may need to be accessed or moved by the universal storage handler 130.

The storage system 110 is at least one storage system configured as a storage type to store data of a data type (e.g., Hadoop Distributed File System (HDFS), REDIS®, ELASTICACHE®, KAFKA, AMAZON S3, etc.). Alternatively, a storage system 110 may be a computing system configured to store data in a data format, for example, a database system (e.g., AMAZON REDSHIFT®, Apache CASSANDRA®, MONGODB®, etc.). A storage type may also refer to a cloud service provider associated with a storage system 110. A storage system 110 may have a fixed amount of total available storage. In order to ease the description of the use of a storage system 110 by the universal storage handler 130 herein, total available storage may be understood to refer to the maximum amount of storage available to a user of the storage system 110 without the need to reconfigure the storage system 110 and/or to request additional storage be provisioned for the storage system 110 (e.g., from a cloud storage provider). The total available storage may change as data is stored, migrated, retrieved, and/or deleted from the storage system 110. The total available storage may be divided into used storage, which is the portion of the total available storage currently being used to store data and therefore unavailable to store additional data; available storage, which is the portion of the total available storage currently available for normal storage operations; and excess storage, which is the portion of the total available storage reserved for future use but not currently in use. In some embodiments, available storage and excess storage may refer to the same storage of the total available storage. A storage system 110 may additionally have a storage manager configured to manage storage and/or retrieval operations for the data store, instead of or in addition to allowing direct access to the storage of the storage system 110. A storage system 110 may be provided and/or managed by a cloud storage provider.

The data processor 160 is a computing system configured to process information provided to it. For example, the data processor 160 may be a streaming information processing system configured to perform batch processing on data before the processed data is stored in a database (e.g., a storage system 110). Alternatively, the data processor 160 may be a message queuing system configured to process incoming information into a message queue, and may further provide access to message queue to a subscriber (e.g., according to a pub-sub message queue system).

The network 150 may be a publicly accessible network of linked networks, some or all of which may be operated by various distinct parties, for example the Internet. In some cases, network 150 may include a private network, personal area network, local area network, wide area network, cellular data network, satellite network, etc., or some combination thereof, some or all of which may or may not have access to and/or from the Internet.

Example Routines for the Storage and Retrieval of Data

Routines described herein may be computer-implemented. When a routine described herein (e.g., routines 200 and 250) is initiated, a set of executable program instructions stored on one or more non-transitory computer-readable media (e.g., hard drive, flash memory, removable media, etc.) may be loaded into memory (e.g., random access memory or RAM) of a computing device, such as the memory of the universal storage handler 130 shown in FIG. 4, and executed by one or more processors. In some embodiments, the routine 200, and 250, or portions thereof may be implemented on multiple processors, serially or in parallel. While some actions, for example monitoring of a storage system 110, storing data in a storage system 110, and/or retrieving data from a storage system 110, may be described in the following example routines 200 and 250 as being performed by the universal storage handler 130, it should be understood that some or all of the functions described may be performed by the requesting system 120, or another computing system of the data processing environment 100. In such embodiments, instructions may be provided to the universal storage handler 130 by another computing system of the data processing environment to perform an action.

Figure 2A:
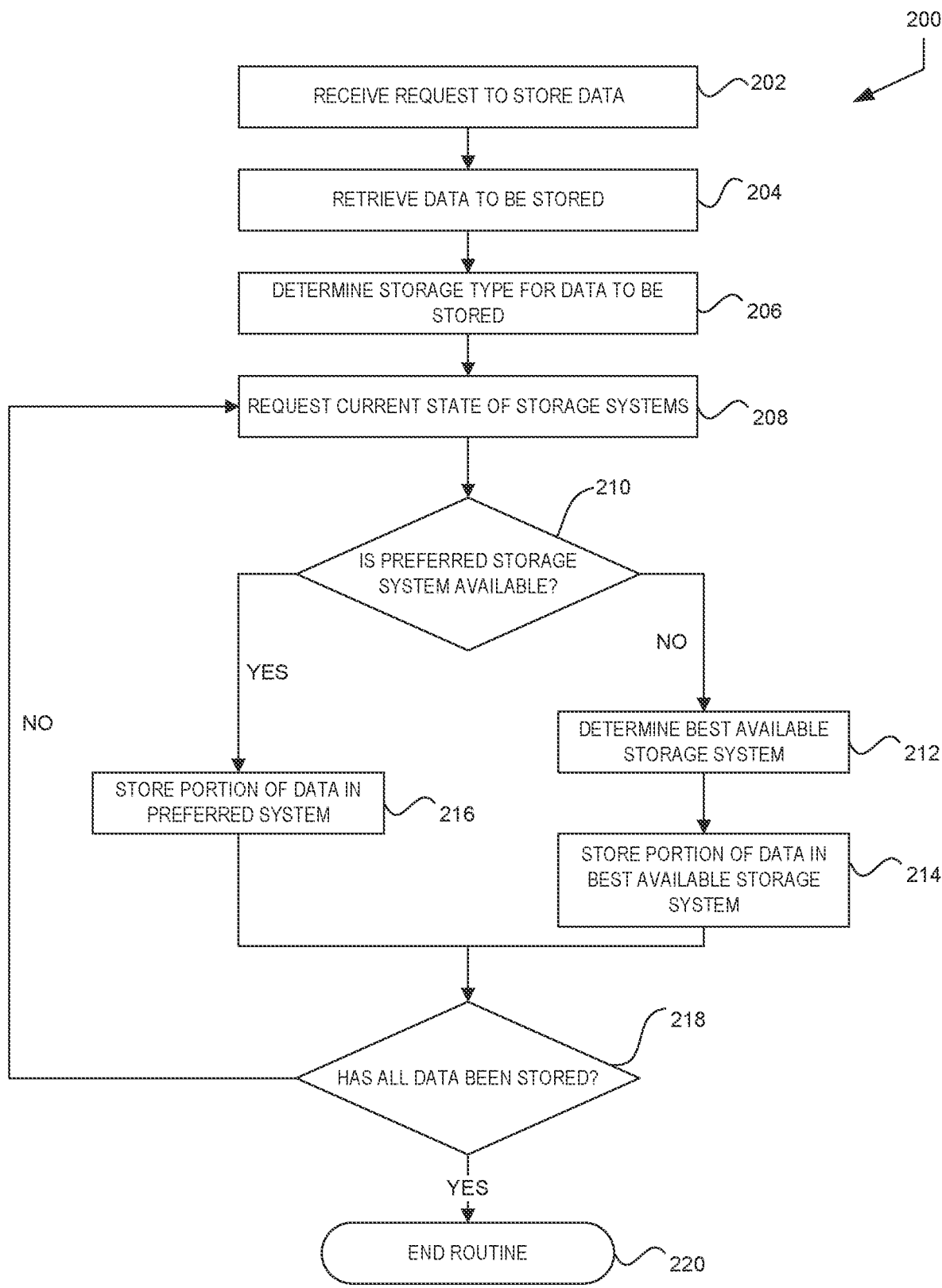
FIG. 2A is a flow diagram of an illustrative routine for storing data using a universal storage handler according to some embodiments.

FIG. 2A illustrates example routine 200 for storing data. The routine 200 begins at block 202, for example in response to the universal storage controller 132 receiving a request from the requesting system 120 to store data (e.g., by an API of the universal storage handler 130). The universal storage controller 132 may then process the request. Alternatively, the routine 200 may begin at block 202 in response to a continuous stream of incoming data (e.g., streaming data to be processed by the data processor 160) exceeding an input capacity of a streaming data receiver (e.g., the data processor 160). The stream of incoming data exceeding the input capacity of the streaming data receiver may then trigger a request to store the excess data generated by the universal storage controller 132. In another embodiment, the request may be a query to a database. The query may include, for example, a SQL query, or an indication of the database to be queried.

In another example, the request may be an indication received from a requesting system that data is to be stored at a storage system in communication with the universal storage handler 130. In such examples, the universal storage handler 130 may perform routine 200 to redirect the storage of data from an intended storage system to available excess storage of a second storage system. Redirecting the storage of data may include redirecting a data stream from the first, intended storage stream to the second, alternative storage system. In a further embodiment, the request may be an indication that a more appropriate or better suited storage system has become available to temporarily store the data. For example, the routine 200 may have led to at least a portion of data being stored in a temporary storage location of a first storage system. The universal storage handler 130 may then receive an indication that a second storage system, having better suited storage parameters (e.g., available space for temporary storage may be less likely to be needed, the second storage system may have a higher data throughput, etc.) has become available. The universal storage handler 130 may then operate to transfer the portion of the data from the first storage system to the second storage system. Further, the universal storage handler 130 may perform routine 250, described below herein, to retrieve the data from the first storage system.

At block 204, the universal storage handler 130 retrieves data to be stored. For example, the data may be stored at a source storage system 110, and the request may indicate the universal storage handler 130 is to migrate the data from the source storage system 110 to a second storage system 110. The universal data loader 136 may then generate a request to the source storage system 110 for the stored data. To generate the request to the source storage system 110, the universal data loader 136 may use configuration information of the configuration manager 134. Alternatively, the data to be stored may be at least a portion of a stream of incoming data, and the data may be received from a data provider 140 without the need to transmit a request. It should be understood that in some embodiments, the universal storage handler 130 may retrieve data at different points in the routine 200, for example the universal storage handler 130 may retrieve data after a storage system for the data has been identified. Where the request is a query to a database, the universal data loader 136 may provide the query to a database system, and receive back a response to the query generated by the database system.

At block 206, the universal storage handler 130 determines a storage format of a storage system 110 necessary to store the retrieved data. For example, the storage format may be a database storage system where the retrieved data is a database. Alternatively, where the retrieved data is a message queue, the storage format may be a publisher-subscriber message queueing system. In another example, the storage format may be a general storage format configured to store data in two or more data types, or configured to store data regardless of the data type (e.g., an S3 bucket, a cloud storage service providing hard disk drive space, etc.). Additionally, a storage format may be based on a requirement associated with the retrieved data to be stored. The requirement may be based on the data type and/or the request to store the data. For example, a requirement may be for the data to be stored for a fixed period of time, to be available within a certain amount of time (e.g., 10 ms after a request for the data is received), or any other requirement which may be associated with the storage or retrieval of the retrieved data.

At block 208, the configuration manager 134 requests a current state of at least one storage system 110 available to the universal storage handler 130. The current state may include, for example, a total amount of storage, a reserved storage space, a used storage space, and/or an available excess storage space of the storage system 110. The configuration manager 134 may request a current state for all storage systems available to the universal storage handler 130. Alternatively, the universal storage handler 130 may request a current state of storage systems having a storage format configured to store the data type of the retrieved data, and/or storage systems capable of meeting a requirement for the data. Additionally, the universal storage handler 130 may request a current state of a storage system configured for general storage. For example, the retrieved data may be a portion of a data stream to be stored until a data processor 160 is available to process the retrieved data. The configuration manager 134 may then determine that there are three storage systems potentially available to store the retrieved data, and request a current state for each of the three storage systems.

At decision block 210, the universal storage handler 130 determines whether there is an intended storage system for the retrieved data, and if so whether the intended storage system is available. For example, retrieved data may be determined to have an intended use in a Hadoop application. The universal storage controller 132 may then identify an intended storage system having a Hadoop Distributed File system (HDFS) type (e.g., an HDFS storage system associated with the requesting system 120, or the data provider 140). The intended storage system may be determined to be not available based on at least one of a lack of available storage capacity, a connection failure, a lack of available processing capacity for new data ingestion, and the like The universal storage controller 132 may then identify additional storage systems having a Hadoop Distributed File system (HDFS) type. The configuration manager 134 may then retrieve the current state of the storage systems having the HDFS type as described in relation to block 208. Based on the current state information retrieved by the configuration manager 134, the universal storage controller 132 may then determine whether an amount of excess storage of the storage systems having the HDFS type is enough to store the retrieved data.

In some embodiments, excess storage for at least a portion of the retrieved data will be available in the intended storage system (e.g., all storage systems having an HDFS type for the previous example), and the universal storage controller 132 may then determine an amount of preferred storage available to store the retrieved data, such that a first portion of the retrieved data will be stored in the intended storage and a second portion of the retrieved data will be stored in a non-preferred storage system (e.g., a general storage system such as an S3 bucket). When an intended storage system is available to store at least a portion of the retrieved data, the routine 200 moves to block 216 for the portion of the retrieved data which may be stored in the intended storage system. When an intended storage system is not available to store the entirety of the retrieved data, the routine 200 moves to block 212 for the portion of the data which cannot be stored in the intended storage system.

At block 212, the universal storage controller 132 determines a best available storage system for the retrieved data. The determination of the best available storage system may be based at least in part, for example, on information from the configuration manager 134 indicating the state and availability of potential storage systems. The best available storage system may be a storage system having a most available reserved storage, a sufficient storage capacity to store the entirety of the retrieved data, a highest bandwidth, a highest availability, meeting a requirement for storage of the retrieved data, and/or determined to be the least likely to require migration of the retrieved data before retrieval or expiry of the retrieved data. In some embodiments, the universal storage controller may rank the available storage systems into a ranked list, or hierarchy, of storage systems. When determining the most appropriate available storage system, the universal storage controller may then use information of the ranked list of storage systems as part of the determination of the most appropriate available storage system. For example, a first storage system may have a higher data throughput rate than a second storage system, and the universal storage controller may rank the first storage system higher than the second storage system based having the higher data throughput rate. It is possible that the universal storage controller 132 may not be able to identify a best available storage system 110 with available capacity to store the retrieved data. The universal storage controlled 132 may then provision additional storage for the retrieved data to ensure the retrieved data is not lost.

At block 214, the universal data loader 136 stores at least a portion of the retrieved data in the determined best available storage system. In embodiments where the request indicated that a requesting system wanted to store data at the intended storage system, storing at least a portion of the retrieved data may include transmitting an indication of the best available storage system to the requesting system. The requesting system may then perform the storage of the portion of the data.

At block 216, the universal data loader 136 stores at least a portion of the retrieved data in the intended storage system. For example, the universal data loader 136 may store a portion of the retrieved data in the intended storage system until the excess storage of the intended storage system is full. In some embodiments, a portion of the excess storage of a storage system may be maintained for use by the data processing environment 100, for example in case of a sudden increase in the volume of incoming data to allow time for data to be migrated from the excess portion to a different data store. In such embodiments, the universal data loader 136 may store data up to the limit of excess storage available for use by the universal storage handler 130. In embodiments where the request indicated that a requesting system wanted to store data at the intended storage system, storing the data in the intended storage system may be performed by transmitting an indication the intended storage system is available to the requesting system. Alternatively, in such embodiments, the universal storage handler 130 may allow for storage of the data at the intended storage system by taking no action.

At decision block 218, the universal storage controller 132 determines whether all of the retrieved data has been stored. When all of the retrieved data has been stored, the routine 200 moves to block 220 and ends. Otherwise, the routine 200 returns to block 208 and a current state of storage systems is requested. In some embodiments, the routine 200 may instead return to decision block 210, for example when a time between storing a first portion of the retrieved data and a second portion is below a threshold, or when a first portion of the retrieved data and a second portion of the retrieved data are stored substantially simultaneously.

When routine 200 of FIG. 2A is complete, the data requested to be stored at block 202 has been stored temporarily in an available storage system 110 different from the intended storage system 110. The available storage system 110 may be a storage system 110 provided by a different cloud storage provider than the cloud storage provider associated with the intended storage system. Advantageously, the data provider 140 does not need to be aware of the cloud storage provider, or the storage system 110 where the data is temporarily stored, as the universal storage handler 130 maintains storage information for the retrieval of the temporarily stored data. Further, the universal storage handler 130 may monitor the availability of the intended storage system 110 to determine when the intended storage system 110 is available to store the data. When the intended storage system 110 becomes available to store the data, the universal storage handler 130 may then automatically transfer the data from the second storage system 110 to the first storage system 110 without the need for additional input from the data provider 140, or any change to the functionality offered by the cloud storage provider. In some embodiments, the universal storage handler 130 may be configured to identify storage systems available for the temporary storage of excess data, and may inform the requesting system 120 of the available storage systems. The requesting system 120 may then store the excess data at the available storage system temporarily, and the universal storage handler 130 may not directly instruct the storage of the excess data in the available storage system.

Figure 2B:
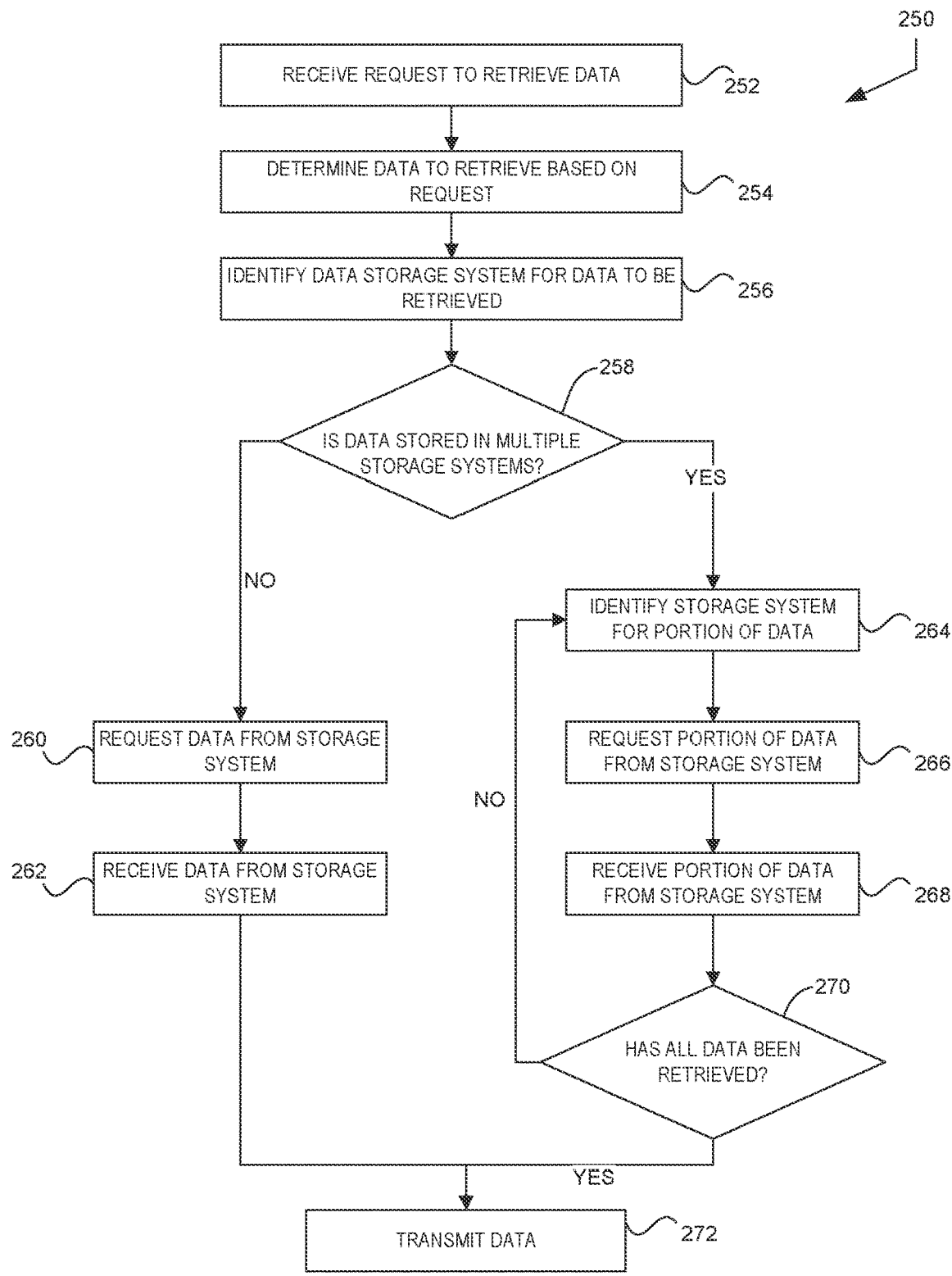
FIG. 2B is a flow diagram of an illustrative routine for retrieving data stored by a universal storage handler according to some embodiments.

FIG. 2B illustrates example routine 250 for retrieving data stored by the universal storage handler 130. The routine 250 begins at block 252, for example in response to receiving a request from the requesting system 120 to retrieve stored data. In another example, routine 250 begins at block 252 in response to receiving a query from the requesting system 120 and determining, by the universal storage controller 132 that the query matches a previously received query for which a response was stored by the universal storage handler 130 in a storage system 110. Alternatively, the routine 250 may begin in response to the universal storage controller 132 determining that the data processor 160 has available information processing capacity, and that data remaining to be processed by the data processor 160 has been stored by the universal storage handler 130 in a storage system 110. Further, the request may be received from a storage system 110 based which is currently storing a data item temporarily. The storage system 110 may transmit an alert to the universal storage handler 130 indicating the temporarily stored data item must be transferred to avoid overwriting the data item.

At block 254, the universal storage controller 132 determines the data to retrieve based on the request. For example, where the request is a query determined to be the same as a previous query for which a response was stored, the universal storage controller 132 may determine to retrieve the response. In another example, where the request is for a portion of data from a streaming data source to be processed by a data processor 160, the universal storage controller 132 may determine an amount of the stored data to retrieve, and/or a timeframe associated with the stored data for which a portion of the stored data is to be retrieved (e.g., the oldest stored data, the most recent stored data, stored data nearest to an expiry time, etc.). Alternatively, where the request is for specific stored data (e.g., enrichment data), the universal storage controller 132 may determine the stored data fulfilling the request.

At block 256, the universal storage controller 132 identifies a storage system 110 storing the data to be retrieved based on the request. In some embodiments, the data to be retrieved may be stored across a plurality of storage systems, and the universal storage controller 132 may identify each storage system storing data to be retrieved. When data is stored across a plurality of storage systems, the universal storage controller 132 may also identify information associated with the data to be retrieved, for example an amount of the data to be retrieved stored in storage system 110, or an order in which the data to be retrieved from each storage system is to be combined.

At decision block 258, the universal storage handler 130 determines whether the data to be retrieved is stored in multiple locations. As discussed previously in reference to FIG. 2A herein, the universal storage handler 130 may store data items, which may be separate data items or portions of a single data item, in different storage systems. If the data is stored in multiple locations, the routine 250 moves to block 264. If the data is stored in a single location the routine 250 moves to block 260.

At block 260, the universal data loader 136 requests data to be retrieved from the storage system 110. The request may indicate a file path of the data in the storage system 110, or other identifier used to locate the stored data to be retrieved. Additionally, the request may include an instruction to retrieve a portion of the data responsive to the request, for example when an available bandwidth for transmitting or receiving the data is limited. At block 262, the universal storage handler 130 receives the data from the storage system 110. Next, at block 264, the universal storage controller 132 and/or the configuration manager 134 identifies a storage system (e.g., a storage system 110) for a portion of the data to be retrieved. For example, when data to be retrieved is intended to be retrieved in an order (e.g., a chronological order), the universal storage controller 132 may identify the storage system storing the portion of the data to be retrieved next based on the order.

At block 266, the universal data loader 136 requests the portion of the data to be retrieved from the identified storage system. As discussed with respect to block 260, the request may be for a portion (e.g., a portion of the portion of data) of the data stored in the identified storage system. At block 268, the universal storage handler 130 receives the portion of the data requested from the identified storage system (e.g., storage system 110).

At decision block 270, the universal storage handler 130 determines whether all data responsive to the request has been retrieved. If all the data responsive to the request has been retrieved, the universal storage handler 130 regenerates the data item, for example by combining the portions of the data item, and the routine 250 moves to block 272. If there is data responsive to the request remaining to be retrieved, the routine 250 returns to block 264. At block 272, the universal storage handler 130 transmits the retrieved data, for example to the requesting system 120 or a data processor 160.

In some embodiments, routine 250 may provide for the automated transfer of data between different cloud storage providers, for example when routine 200 has stored data temporarily at a second storage system 110 different from an intended storage system 110. In such embodiments, the request to retrieve data may be generated by the universal storage handler 130 in response to determining that the intended storage system 110 has become available to store data temporarily stored at the second storage system 110. Routine 250 may then operate to allow the universal storage handler 130 to automatically transfer the data from the second storage system 110 to the intended storage system 110 without the need for input from a data provider 140, or a change in the functioning of storage systems provided by different cloud storage providers. Alternatively, the universal storage handler 130 may notify the requesting system 120 that the intended storage system 110 has become available, and the requesting system 120 may then initiate the transfer of the temporarily stored data from the second storage system 110 to the intended storage system 110. The requesting system may then transmit a request to store the excess data in the intended storage system 110 in response to the notification.

Example Management of Data Spike Process

Figure 3:
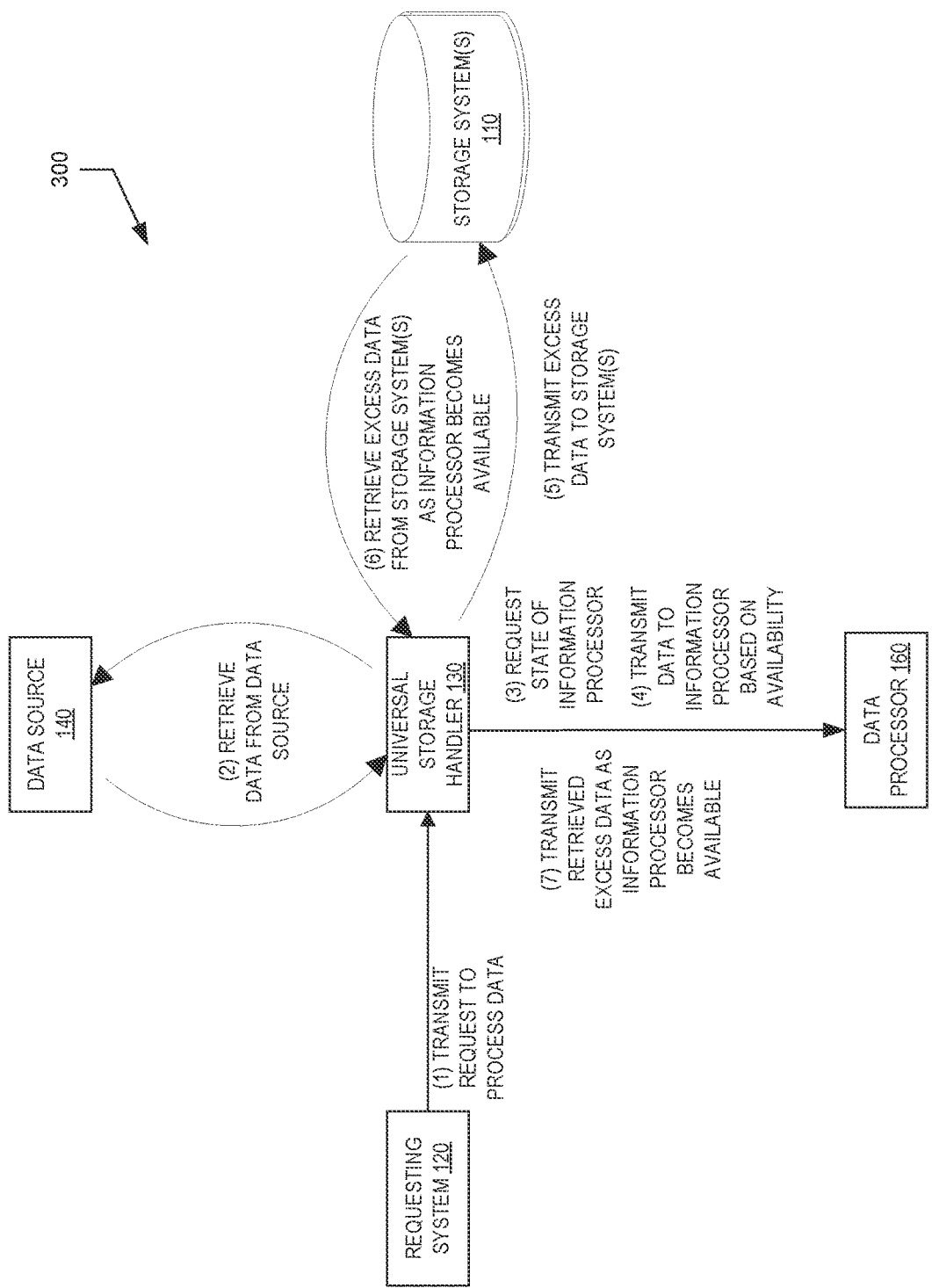
FIG. 3 is an illustrative process for managing a spike in data for an information processor by a universal storage handler according to some embodiments.

FIG. 3 illustrates an example process 300 for managing a spike in incoming data items directed to a data processor 160 using the universal storage handler 130. The process 300 begins at (1) with the requesting system 120 transmitting a request to process data using the data processor 160 to the universal storage handler 130. In some embodiments, the request may not be an express request from the requesting system 120, and may instead be based on the connection of a streaming data source (e.g., data provider 140) to a data processor 160.

At (2), the universal storage handler 130 retrieves data from the data provider 140 based on the request. Retrieving data may include the universal data loader 136 transmitting a request for data, which may indicate a rate of transmission at which the data should be transmitted, to the data provider 140. Alternatively, retrieving the data may be the data provider 140 transmitting streaming data to the universal storage handler 130 as the data is generated and/or received by the data provider 140.

At (3), the configuration manager 134 requests a state of the data processor 160. The state information may include a current available processing capacity of the data processor 160, an indication that a maximum processing capacity has been exceeded, or any other information which may be used by the configuration manager 134 to determine the state of the data processor 160.

At (4), the universal data loader 136 transmits at least a portion of the data retrieved from the data provider 140 to the data processor 160 based on the availability of the data provider 140. Availability may be, for example, an available processing capacity (e.g., 2 GB/s of data) of the data provider 140, or a time during which the data processor 160 is available to process data.

At (5), the universal data loader 136 transmits data exceeding the availability of the data processor 160 to a storage system 110, as described in reference to FIG. 2A. In some embodiments, the excess data may be stored across a plurality of storage systems, where portions of the excess data are stored in a storage system according to the excess storage available for use in the data store.

At (6), the universal data loader 136 retrieves stored excess data from a storage system 110 based on the data processor 160 having available processing capacity. For example, the data processor 160 may continuously process an incoming stream of data, which may be transmitted to the data processor 160 by the universal storage handler 130. The amount of data of the incoming stream of data may generally be below the maximum processing capacity of the data processor 160. The universal storage handler 130 may then determine the data processor 160 is currently processing an amount of data below the maximum processing capacity. In response to determining the data processor 160 is processing less than its maximum processing capacity, the universal data loader 136 may request data of an amount that will not exceed the maximum processing capacity of the data processor 160 when combined with the current incoming streamlining data until all stored excess data intended to be processed by the data processor 160 has been processed or has expired. In some embodiments, the universal storage handler 130 may transmit a status request to the data processor 160 to determine when the data processor 160 has become available to process the stored excess data. The universal storage handler 130 may then retrieve excess data when the data processor has responded to the status request to indicate the data processor 160 is available.

At (7), the universal data loader 136 transmits the retrieved excess data to the data processor 160 for processing. The universal data loader 136 may transfer portions of the retrieved excess data to the data processor 160 based on a difference between the currently used processing capacity of the data processor 160 and the maximum available processing capacity of the data processor 160. As discussed in relation to (6) this may continue until all excess data to be processed by the data processor 160 has been processed, or has expired. In some embodiments, the universal storage handler 130 may notify the requesting system 120 that the data processor 160 has become available, and allow the requesting system to retrieve the excess data stored at the storage system 110 and provide the retrieved excess data to the data processor 160.

The process 300 may allow for the universal storage handler 130 to provide temporary storage of streaming data in a storage system different from a provider of the data processor 160 and/or the data provider 140. For example, the data provider 140 may be under the control of an airline travel information system, and the data processor 160 may be under the control of a travel search provider. When data is received from the data provider 140 in excess of what the data processor 160 of the travel search provider is configured to process. The travel search provider may not be able to control the flow of data from the data provider 140, as it is managed by a separate entity. The data in excess of the processing capacity of the data processor 160 would then be lost to the travel information provider due to a lack of processing capacity, as the data processor 160 is not designed to store data. The travel search provider may then use the universal storage handler 130 to temporarily store the excess data in a storage system 110, which may be offered by a cloud storage provider, and which may be used for a different purpose by the travel search provider (e.g., a database system which maintains travel information collected from a plurality of airline travel information systems).

Execution Environment

Figure 4:
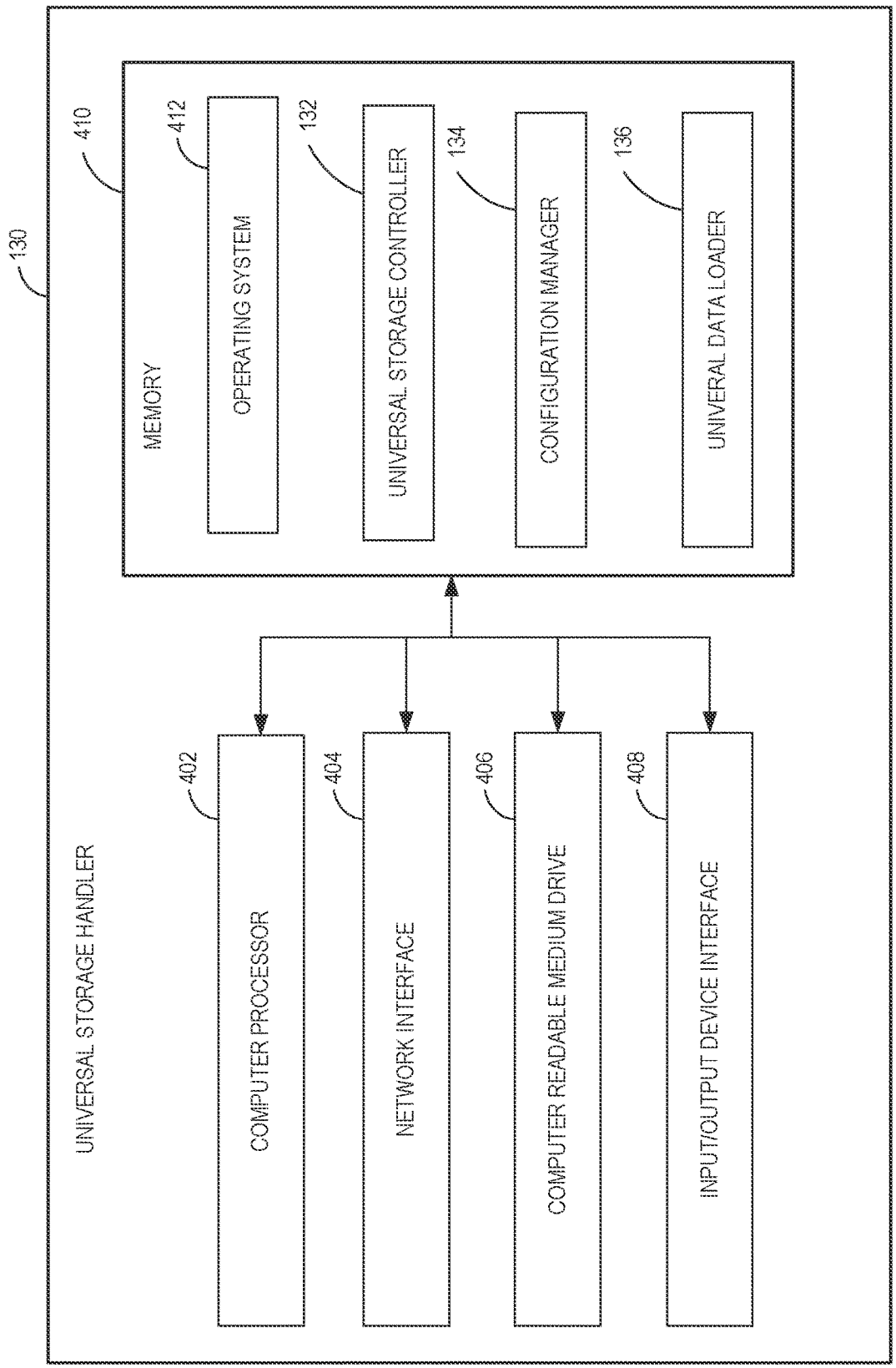
FIG. 4 is a block diagram of an illustrative computing system configured to implement a universal storage handler according to some embodiments.

FIG. 4 illustrates various components of an example universal storage handler 130 configured to implement various functionality described herein. In some embodiments, the universal storage handler 130 may be implemented using any of a variety of computing devices, such as server computing devices, desktop computing devices, personal computing devices, mobile computing devices, mainframe computing devices, midrange computing devices, host computing devices, or some combination thereof.

In some embodiments, the features and services provided by the universal storage handler 130 may be implemented as web services consumable via one or more communication networks. In further embodiments, the universal storage handler 130 is provided by one or more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment In some embodiments, as shown, a universal storage handler 130 may include: one or more computer processors 402, such as physical central processing units ("CPUs"); one or more network interfaces 404, such as a network interface cards ("NICs"); one or more computer-readable medium drives 406, such as a high density disk ("HDDs"), solid state drives ("SSDs"), flash drives, and/or other persistent non-transitory computer-readable media; one or more input/output device interfaces 408; and one or more computer-readable memories 410, such as random access memory ("RAM") and/or other volatile non-transitory computer-readable media.

The computer-readable memory 410 may include computer program instructions that one or more computer processors 402 execute and/or data that the one or more computer processors 402 use in order to implement one or more embodiments. For example, the computer-readable memory 410 can store an operating system 412 to provide general administration of the universal storage handler 130. As another example, the computer-readable memory 410 can store a universal storage controller 132. As another example, the computer-readable memory 410 can store a configuration manager 134. As a further, example, the computer-readable memory 410 can store a universal data loader 136.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design conditions imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   computer-readable memory to store executable instructions; and
   a processor in communication with the computer-readable memory, wherein the processor is configured by the executable instructions to at least:
      receive a request to store data;
      identify, based at least in part on the request, a first storage system in which the data is intended to be stored, wherein the first storage system is associated with a first storage type;
      determine that storing the data in the first storage system would temporarily exceed an available storage of the first storage system;
      in response to determining that storing the data in the first storage system would temporarily exceed the available storage of the first storage system,
         identify, based at least in part on the request, a second storage system, which is available for temporary storage of the data, from a plurality of storage systems, wherein the second storage system is associated with a second storage type, wherein the second storage system is associated with a first storage characteristic, and wherein the second storage type is different from the first storage type;

identify, based at least in part on the request, a third storage system, which is available for temporary storage of the data, from a plurality of storage systems, wherein the third storage system is associated with a third storage type, and wherein the third storage system is associated with a second storage characteristic;

determine the first storage characteristic is preferred over the second storage characteristic;

determine that the second storage system has excess storage capacity;

in response to determining that the second storage system has excess storage capacity, transmit a least a portion of the data to the second storage system for temporary storage without provisioning additional storage for the portion of the data in the first storage system, wherein the portion of the data is transmitted to the second storage system based further in part on the first storage characteristic being determined to be preferred over the second storage characteristic;

determine the first storage system has become available to store the portion of the data temporarily stored in the second storage system;

retrieve the portion of the data from the second storage system; and return, to the first storage system, the portion of the data.

2. The system of claim 1, wherein the data is intended to be stored in excess storage of the first storage system.

3. The system of claim 1, wherein transmitting at least a portion of the data to the second storage system for temporary storage comprises temporarily redirecting a stream of the data to the second storage system.

4. The system of claim 1, wherein the processor is configured by further executable instructions to at least:
receive a request to access the data;
determine a current storage location for the portion of the data is the second storage system; and
retrieve the portion of the data from the second storage system.

5. A computer-implemented method comprising:
receiving a request to store data;
identifying a first storage system in which the data is intended to be stored, wherein the first storage system is associated with a first storage type;
determining that storing the data in the first storage system would temporarily exceed an available storage of the first storage system;
in response to determining that storing the data in the first storage system would temporarily exceed the available storage of the first storage system,
identifying, based at least in part on the request, a second storage system, which is available for temporary storage of the data, from a plurality of storage systems, wherein the second storage system is associated with a second storage type, wherein the second storage system is associated with a first storage characteristic, and wherein the second storage system has excess storage capacity;
identifying, based at least in part on the request, a third storage system, which is available for temporary storage of the data, from a plurality of storage systems, wherein the third storage system is associated with a third storage type, and wherein the third storage system is associated with a second storage characteristic;

determining the first storage characteristic is preferred over the second storage characteristic;

determining that storing the data in the data's entirety in the second storage system would exceed the excess storage capacity of the second storage system;

in response to determining that storing the data in the data's entirety in the second storage system would exceed the excess storage capacity of the second storage system, transmitting a first portion of the data to the second storage system for temporary storage without provisioning additional storage for the first portion of the data in the first storage system, wherein storing the first portion of the data in the second storage system does not exceed the excess storage capacity of the second storage system, wherein the first portion of the data is transmitted to the second storage system based further in part on the first storage characteristic being determined to be preferred over the second storage characteristic;

transmitting a second portion of the data to the third storage system for temporary storage without provisioning additional storage for the second portion of the data in the first storage system, wherein storing the second portion in the third storage system does not exceed the excess storage capacity of the third storage system;

determining the first storage system has become available to store the first portion of the data temporarily stored in the second storage system;

retrieving the first portion of the data from the second storage system; and returning, to the first storage system, the first portion of the data.

6. The computer-implemented method of claim 5 further comprising redirecting the second portion of the data from the third storage system to the first storage system.

7. The computer-implemented method of claim 5, wherein redirecting the first portion of the data from the second storage system to the first storage system:
retrieving the first portion of the data from the second storage system; and
returning, to the first storage system, the first portion of the data.

8. The computer-implemented method of claim 7 further comprising combining the first portion of the data and the second portion of the data.

9. The computer-implemented method of claim 5, wherein the first storage system is identified in response to a database query, wherein the data comprises a query response, and wherein the computer-implemented method further comprises:
transmitting the database query to a database system; and
receiving the data from the database system.

10. The computer-implemented method of claim 5 further comprising:
receiving an alert indicating the excess storage capacity of the second storage system is required to store data associated with the second storage type;
identifying a fourth storage system, which is available for temporary storage of the first portion of the data, from the plurality of storage systems, wherein the fourth storage system has excess storage capacity;
retrieving the first portion from the second storage system; and
transmitting the first portion of the data to the fourth storage system for temporary storage.

11. The computer-implemented method of claim 5, wherein the third storage system is associated with a first storage characteristic, and wherein the computer-implemented method further comprises:

identifying a fourth storage system, which is available for temporary storage of the data, from the plurality of storage systems, wherein the third storage system has excess storage capacity, and wherein the fourth storage system is associated with a second storage characteristic;

determining the second storage characteristic is preferred over the first storage characteristic;

redirecting the second portion of the data from the third storage system to the fourth storage system.

12. A non-transitory computer-readable storage medium storing computer-executable instructions that, when executed by a processor, cause the processor to at least:

identify, based at least in part on a request from a requesting system to store data, an intended storage system for the data, wherein the intended storage system is associated with a first storage type;

determine that the intended storage system is unavailable to store the data;

in response to determining that the intended storage system is unavailable to store the data, identify, based at least in part on the request, a first alternative storage system that is available for temporary storage of the data, wherein the first alternative storage system is associated with a second storage type, wherein the first alternative storage system is associated with a first storage characteristic, and wherein the second storage type is different from the first storage type;

identify, based at least in part on the request, a second alternative storage system, which is available for temporary storage of the data, from a plurality of storage systems, wherein the second alternative storage system is associated with a third storage type, and wherein the second alternative storage system is associated with a second storage characteristic;

determine the first storage characteristic is preferred over the second storage characteristic;

determine that the first alternative storage system has excess storage capacity;

in response to determining that the first alternative storage system has excess storage capacity, direct at least a portion of the data to the first alternative storage system for temporary storage without provisioning additional storage for the portion in the intended storage system, wherein the portion of the data is directed to the first alternative storage system based further in part on the first storage characteristic being determined to be preferred over the second storage characteristic;

determine the intended storage system has become available to store the portion of the data temporarily stored in the first alternative storage system;

retrieve the portion of the data from the first alternative storage system; and notify the requesting system that the intended storage system has become available to store the portion of the data.

13. The non-transitory computer-readable storage medium of claim 12, wherein the non-transitory computer-readable storage medium stores further computer-executable instructions that, when executed by the processor, cause the processor to at least:

receive a second request from the requesting system, in response to the notification the intended storage system has become available, to store the portion of the data in the intended storage system; and direct the portion of the data to the intended storage system.

14. The non-transitory computer-readable storage medium of claim 12, wherein the intended storage system is determined to be unavailable based on at least one of: a lack of available storage capacity, a connection failure, or a lack of processing capacity.

15. The non-transitory computer-readable storage medium of claim 12, wherein the first storage type is at least one of: a database storage type, a streaming data storage type, or a type provided by a first service provider.

16. The non-transitory computer-readable storage medium of claim 12, wherein the non-transitory computer-readable storage medium stores further computer-executable instructions that, when executed by the processor, cause the processor to at least transmit, to the requesting system, a notification indicating the portion of the data is stored in the first alternative storage system.

17. The non-transitory computer-readable storage medium of claim 12, wherein to determine that the intended storage system has become available, the non-transitory computer-readable storage medium stores further computer-executable instructions that, when executed by the processor, cause the processor to at least:

transmit a status request to the intended storage system; and receive a current status indication from the intended storage system indicating the intended storage system has storage capacity to store the portion of the data temporarily stored in the first alternative storage system.

18. The non-transitory computer-readable storage medium of claim 12, wherein the non-transitory computer-readable storage medium stores further computer-executable instructions that, when executed by the processor, cause the processor to at least direct at least another portion of the data to a second alternative storage system for temporary storage.

19. The non-transitory computer-readable storage medium of claim 12, wherein the requesting system is a streaming data source, and wherein the intended storage system comprises a streaming data processing system.

\* \* \* \* \*